(12) United States Patent
Liao et al.

(10) Patent No.: US 10,956,336 B2
(45) Date of Patent: Mar. 23, 2021

(54) EFFICIENT SILENT DATA TRANSMISSION BETWEEN COMPUTER SERVERS

(71) Applicant: International Business Machines Corporation, Armonk, NY (US)

(72) Inventors: Mengze Liao, Shanghai (CN); Yang Liu, Shanghai (CN); Jiang Yu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 157 days.

(21) Appl. No.: 16/040,760

(22) Filed: Jul. 20, 2018

(65) Prior Publication Data

US 2020/0026656 A1   Jan. 23, 2020

(51) Int. Cl.
*G06F 12/00* (2006.01)
*G06F 12/0875* (2016.01)
(Continued)

(52) U.S. Cl.
CPC ...... *G06F 12/0875* (2013.01); *G06F 12/1081* (2013.01); *G06F 13/4282* (2013.01);
(Continued)

(58) Field of Classification Search
CPC ............. G06F 12/0875; G06F 12/1081; G06F 13/4282; G06F 2212/452; G06F 2212/621; G06F 2213/0026; G06F 2213/28
See application file for complete search history.

(56) References Cited

U.S. PATENT DOCUMENTS

| 4,400,772 A * | 8/1983 | Broyles | G11C 29/88 |
| | | | 710/22 |
| 6,003,106 A * | 12/1999 | Fields, Jr. | G06F 13/28 |
| | | | 710/22 |

(Continued)

FOREIGN PATENT DOCUMENTS

| CN | 106210041 A | 12/2016 |
| WO | 2015138245 A1 | 9/2015 |
| WO | 2016196766 A2 | 12/2016 |

OTHER PUBLICATIONS

ROCE, RoCE accelerates data center performance, cost efficiency, and scalability, Jan. 2017, 9 pages.

*Primary Examiner* — Prasith Thammavong
(74) *Attorney, Agent, or Firm* — Cantor Colburn LLP; Jason Sosa (57) ABSTRACT

Aspects of the invention include receiving a request to transfer data from a first storage device, coupled to a sending server, to a second storage device, coupled to a receiving server. The data is transferred from the first storage device to the second storage device in response to the request. The transferring includes allocating a first temporary memory on the sending server and moving the data from the first storage device to the first temporary memory. The transferring also includes initiating a remote direct memory access (RDMA) between the first temporary memory and a second temporary memory on the second server. The RDMA causes the data to be transferred from the first temporary memory to the second temporary memory independently of an operating system executing on a processor of the sending server or the receiving server. The transferring further includes receiving a notification that the transfer completed.

20 Claims, 8 Drawing Sheets

(51) Int. Cl.
 *G06F 12/1081* (2016.01)
 *G06F 13/42* (2006.01)
(52) U.S. Cl.
 CPC .. *G06F 2212/452* (2013.01); *G06F 2212/621* (2013.01); *G06F 2213/0026* (2013.01); *G06F 2213/28* (2013.01)

(56) References Cited

U.S. PATENT DOCUMENTS

| | | | | |
|---|---|---|---|---|
| 6,163,815 | A * | 12/2000 | Fields, Jr. | G06F 13/4027 710/28 |
| 7,281,030 | B1 * | 10/2007 | Davis | H04L 67/1097 709/212 |
| 2002/0144027 | A1 * | 10/2002 | Schmisseur | G06F 13/28 710/22 |
| 2005/0060441 | A1 * | 3/2005 | Schmisseur | G06F 13/28 710/22 |
| 2006/0059242 | A1 * | 3/2006 | Blackmore | G06F 12/1081 709/211 |
| 2006/0075057 | A1 * | 4/2006 | Gildea | H04L 67/1097 709/212 |
| 2008/0162663 | A1 * | 7/2008 | Schlansker | G06F 13/385 709/217 |
| 2008/0301379 | A1 * | 12/2008 | Pong | G06F 12/0692 711/148 |
| 2010/0153514 | A1 * | 6/2010 | Dabagh | G06F 13/4022 709/213 |
| 2013/0318119 | A1 * | 11/2013 | Dalal | G06F 13/1652 707/769 |
| 2014/0146180 | A1 * | 5/2014 | Denham | H04N 5/33 348/164 |
| 2017/0024334 | A1 * | 1/2017 | Bergsten | H04L 67/1097 |
| 2017/0052916 | A1 * | 2/2017 | Kollu | G06F 13/4022 |
| 2017/0177541 | A1 * | 6/2017 | Berman | G06F 15/17331 |
| 2017/0371813 | A1 * | 12/2017 | Brewer | G06F 13/28 |
| 2018/0004705 | A1 * | 1/2018 | Menachem | G06F 15/17331 |

\* cited by examiner

FIG. 8 ated description taken in conjunction with the accompanying drawings
EFFICIENT SILENT DATA TRANSMISSION BETWEEN COMPUTER SERVERS

BACKGROUND

Embodiments of the present invention relate in general to data transmission between computer servers, and more specifically to an efficient methodology of silent data transmission for non-volatile memory express (NVMe) and remote direct memory access (RDMA).

With the rapid development and deployment of big data and deep learning, there are more and more scenarios where large amounts of data are copied from storage on one distributed server to another. An example is a data shuffle such as that used by the MapReduce framework to globally exchange intermediate data generated by a mapping phase prior to performing a reducing phase. When using non-volatile memory express (NVMe) as a protocol to move data between servers, contemporary techniques require a processor on the sending server to send a command to a network interface card (NIC) to copy the data to be moved to a local memory. Once the data has been moved to the local memory, the processor sends a NVMe command to the NIC to move the data to storage or to a remote server. This contemporary process of copying the data to local memory first and then to the storage results in consuming a large amount of bandwidth between both the processor and a switch (e.g., a peripheral component interconnect express, or "PCIe" switch), and between the processor and the local memory. In addition, the process can result in a large number of interrupts from both the NIC and NVMe.

Accordingly, while current data transmission techniques between servers are suitable for their intended purposes, what is needed is a system or method having certain features of embodiments of the present invention.

SUMMARY

Embodiments of the present invention include methods, systems, and computer program products for efficient silent data transmission between computer servers. A non-limiting example method includes receiving a request to transfer data from a first storage device to a second storage device. The first storage device is coupled to a sending server and the second storage device is coupled to a receiving server. The data is transferred from the first storage device to the second storage device in response to the request. The transferring includes allocating a first temporary memory on the sending server and moving the data from the first storage device to the first temporary memory. The transferring also includes initiating a transfer of the data to the second storage device via a remote direct memory access (RDMA) between the first temporary memory and a second temporary memory on the second server. The RDMA causes the data to be transferred from the first temporary memory to the second temporary memory independently of an operating system executing on a processor of the sending server and independently of an operating system executing on a processor of the receiving server. The transferring further includes receiving a notification that the transfer to the second storage device was completed.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Contemporary big data algorithms and distributed systems can require frequent movement of data from storage in one server to storage in another server. Functions such as, but not limited to sorting and shuffling can require data movement between servers. Although processors on the servers do not use the data being sorted or shuffled, these functions consume processor internal bus bandwidth and memory bandwidth. One or more embodiments of the present invention provide for silent data transmission between remote direct memory access (RDMA) network interface cards (NICs) and non-volatile memory express (NVMe)

devices containing peripheral component interconnect express (PCIe) memory, for both data and interrupts, and without using the PCIe root complex.

Figure 1:
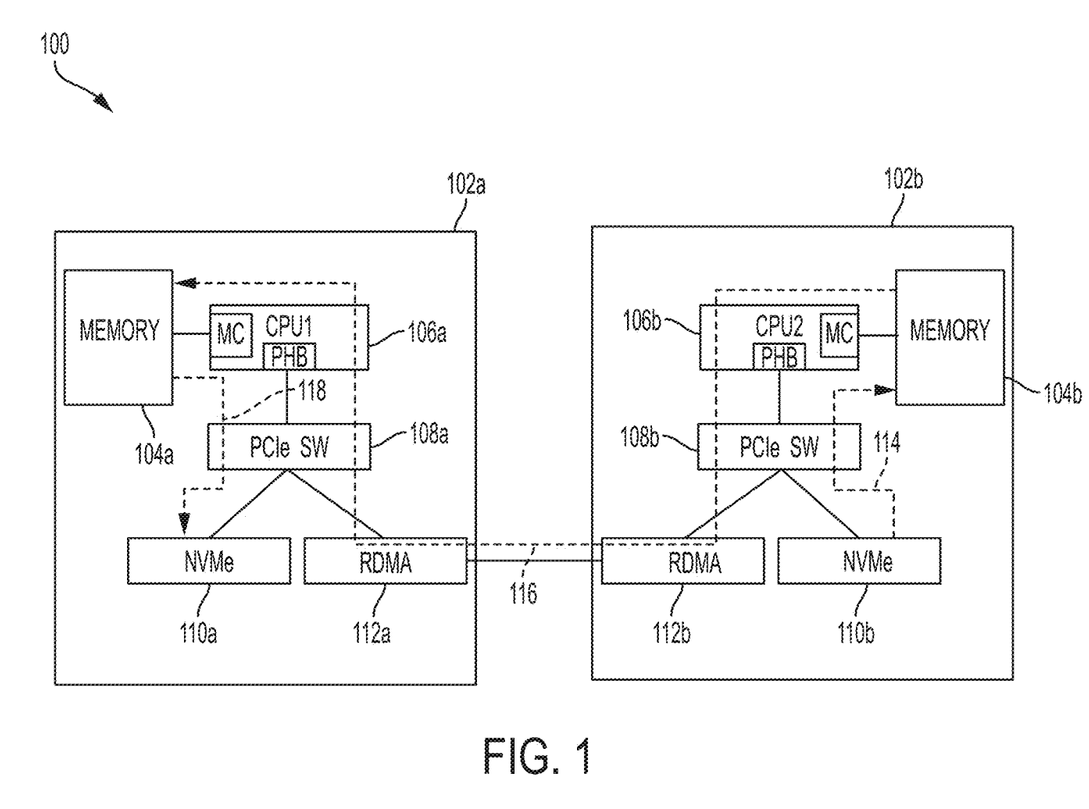
FIG. 1 depicts a system for transmitting data between servers using remote direct memory access (RDMA)

Turning now to FIG. 1, a system 100 for transmitting data between servers using remote direct memory access (RDMA) is generally shown. FIG. 1 depicts two servers 102a 102b that each include local memory 104a 104b, a central processing unit (CPU) 106a 106b, a PCIe switch 108a 108b, an RDMA NIC 112a 112b, and an NVMe device 110a 110b (e.g., a controller and/or peripheral storage device) accessed via PCIe bus. As shown in FIG. 1, each CPU 106a 106b, or processor, includes a memory controller (labeled "MC") and an I/O bus (labeled "PHB"). As used herein, the term "local memory" refers to memory attached to a CPU by a MC, such as local memory 104a of FIG. 1. Peripheral storage devices, such as NVMe device 110a of FIG. 1, can include, but are not limited to: NVMe; HDD; SSD; tape; CD/DVD ROM; and network attached storage (NAS).

As shown in FIG. 1, a request is made by CPU 106b to move data from NVMe device 110b to NVMe device 110a. The request includes CPU 106b sending a command to PCIe switch 108b to retrieve the specified data from NVMe device 110b. The flow of the data being moved from NVMe device 110b to PCIe switch 108b to CPU 106b to local memory 104b is shown in FIG. 1 by arrow 114. After the copying to local memory 104b is complete, CPU 106b sends a command to move the data from the local memory 104b to remote server 102a using RDMA NIC 112b. The flow of the data being moved from local memory 104b to CPU 106b to PCIe switch 108b to RDMA NIC 112b to RDMA NIC 112a to PCIe switch 108a to CPU 106a to local memory 104a is shown in FIG. 1 as arrow 116. Once the data is stored in local memory 104a it is moved to PCIe memory in NVMe device 110a. The flow of the data being moved from local memory 104a to CPU 106a to PCIe switch 108a to NVMe device 110a is shown in FIG. 1 by arrow 118.

A drawback to the processing shown in FIG. 1 is that because data is transferred from the PCIe switch 108a 108b into local memory 104a 104b and then back out to the PCIe switch 108a 108b from local memory 104a 104b, it consumes a lot of bandwidth (at least twice the size of the data) between the CPUs 106a 106b and the PCIe switches 108a 108b, as well as the bus between the local memories 104a 104b and the CPUs 106a 106b. Another drawback to the processing shown in FIG. 1 is that the CPUs 106a 106b have to handle a large number of interrupts from the NVMe devices 110a 110b and the RDMA NICs 112a 112b while moving the data from NVMe device 110b to NVMe device 110a.

One or more embodiments of the present invention, such as that shown in FIG. 2 below, provide silent data transmission between RDMA NICs and NVMe devices. This allows data and interrupts related to the data transfer to be processed independently of the PCIe root complex. As used herein, the term "PCIe root complex" refers to the interface between a CPU and a PCIe buses, such as the interface between PCIe switch 108a and CPU 106a of FIG. 1. One or more embodiments of the present invention remove the bandwidth consumption between the CPUs 106a 106b and the PCIe switches 108a 108b, and the utilization of the bus between the local memories 104a 104b and the CPUs 106a 106b.

Figure 2:
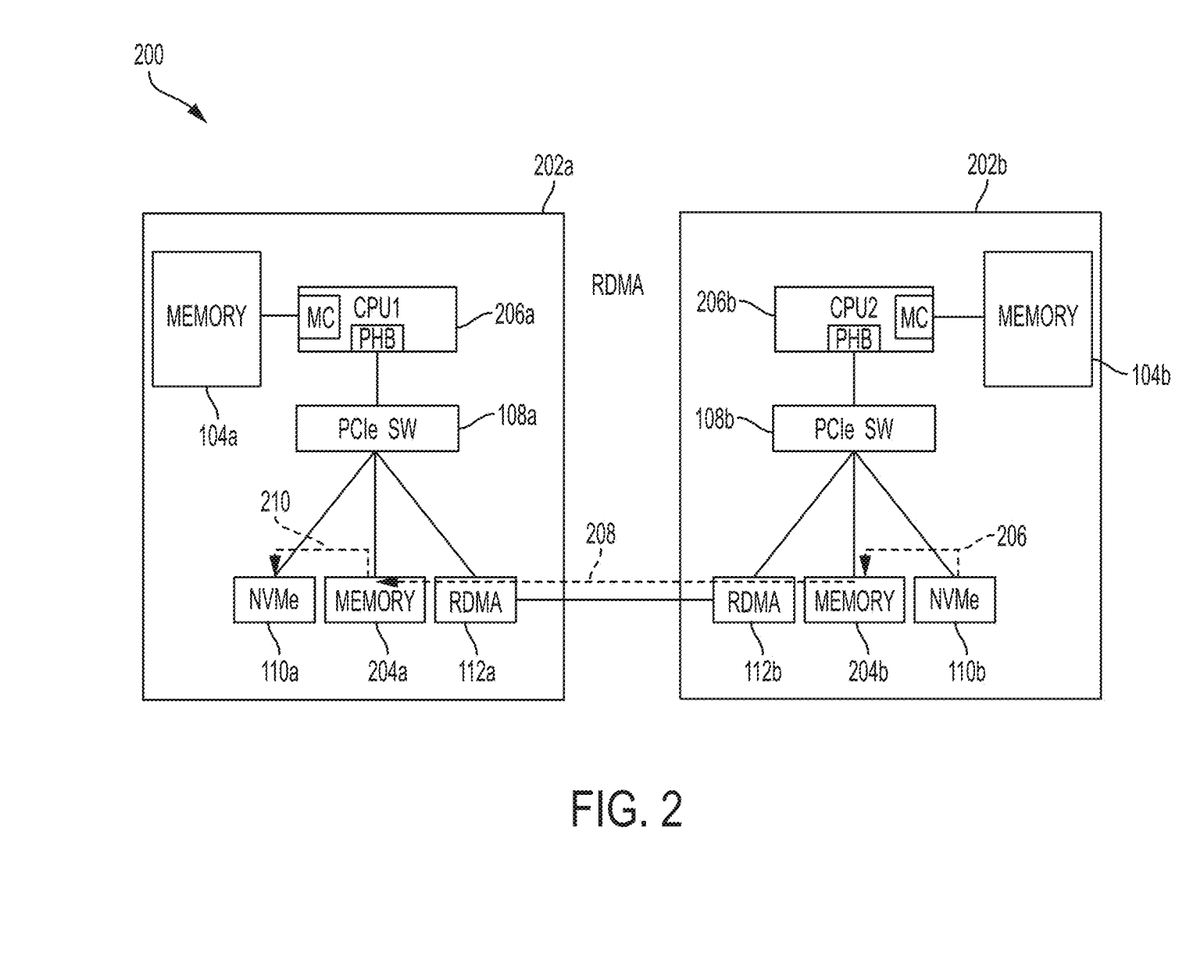
FIG. 2 depicts a system for transmitting data between servers using RDMA in accordance with one or more embodiments of the present invention.

Turning now to FIG. 2, a system 200 for transmitting data between servers using RDMA is generally shown in accordance with one or more embodiments of the present invention. FIG. 2 depicts two servers 202a 202b that each include local memory 104a 104b, a central processing unit (CPU) 206a 206b, a PCIe switch 108a 108b, an RDMA NIC 112a 112b, temporary memory 204a 204b, and NVMe device 110a 110b accessed via a PCIe bus. As shown in FIG. 2, each CPU 206a 206b, or processor, includes a memory controller (labeled "MC") and an I/O bus (labeled "PHB").

As shown in FIG. 2, a request is made by CPU 206b (e.g., by an operating system executing on the CPU 206b) to move data from NVMe device 110b to NVMe device 110a. The request includes CPU 206b generating a RDMA/NVMe pass-through command that is sent to NVMe device 110b. From a physical point of view, the PCIe switch 108b just forwards the command from CPU 206b to the NVMe device 110b, and the NVMe device 110b executes the command to retrieve the specified data from NVMe device 110b. In addition, temporary memory 204b from the PCIe memory space is allocated by an operating system executing on CPU 206b. In an embodiment, the temporary memory 204b is managed by and allocated by the operating system to hold the data from the NVMe device 110b. After the data is transmitted to RDMA NIC 112a through RDMA NIC 112b, the temporary memory 204b can be reused for the next piece of data.

The RDMA/NVMe pass-through command received from CPU 206b specifies the data to be copied from the NVMe device 110b and the location of the temporary memory 204b. The flow of the data being moved from NVMe device 110b to temporary memory 204b is shown in FIG. 2 by arrow 206. After the copying to the temporary memory 204b is complete, an RDMA write command, which is embedded in the RDMA/NVMe pass-through command, is executed by the RDMA NIC 112b. In an embodiment, the RDMA write command is sent by NVMe device 110b to RDMA NIC 112b after the NVMe device 110b completes its data movement. The flow of the data being moved from temporary memory 204b to RDMA NIC 112b to RDMA NIC 112a to temporary memory 204a is shown in FIG. 2 by arrow 208. Once the data is stored in temporary memory 204a it is moved to NVMe device 110a, this flow is shown by arrow 210.

Figure 3:
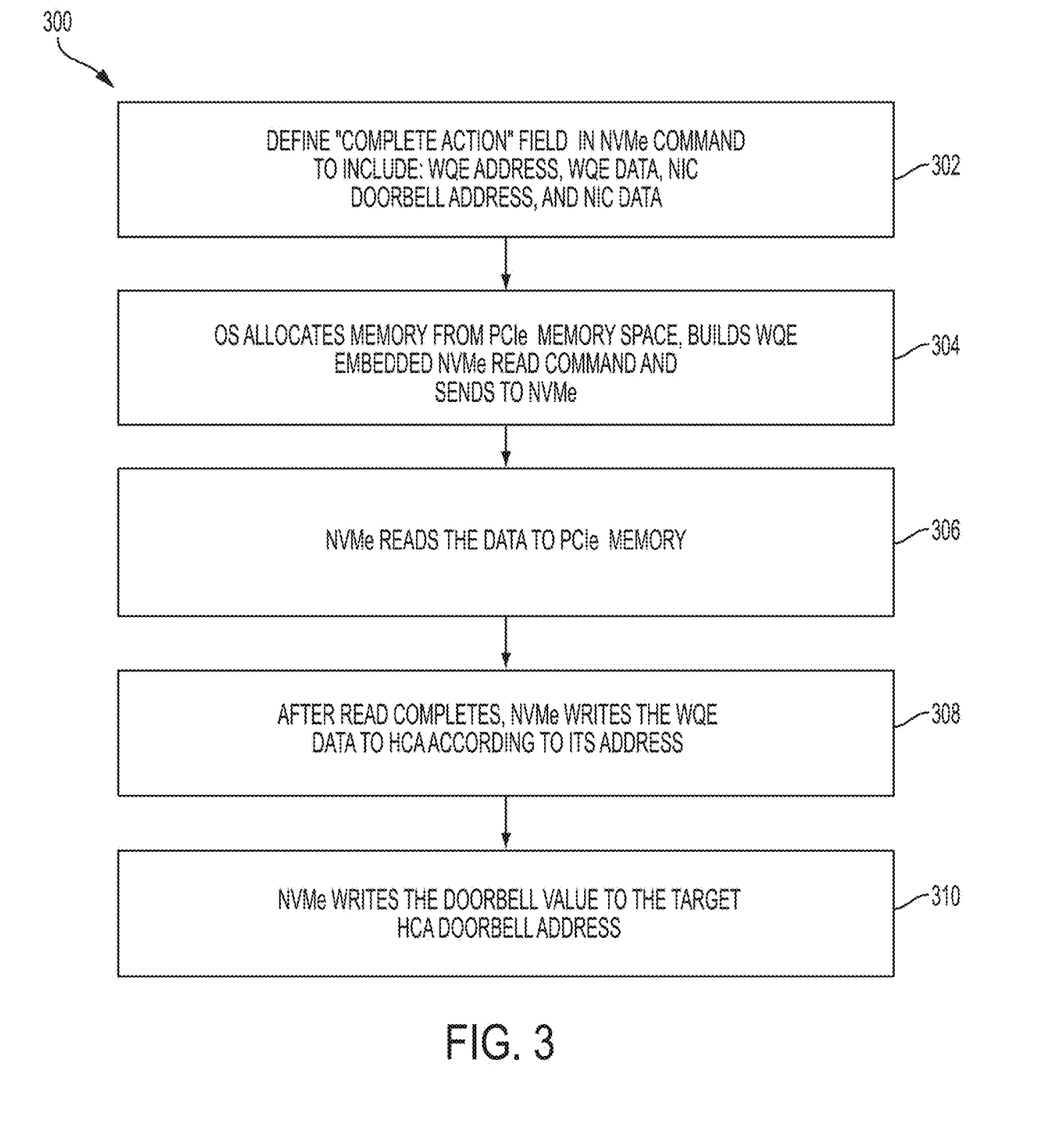
FIG. 3 depicts a process flow for moving data from a non-volatile memory express (NVMe) device to an RDMA network interface card (NIC) in accordance with one or more embodiments of the present invention.

Turning now to FIG. 3, a process flow 300 for moving data from a NVMe device to a RDMA NIC on a sending server is generally shown in accordance with one or more embodiments of the present invention. The processing shown in FIG. 3 describes how an operating system executing on a server controls an NVMe device to move data to temporary memory (e.g., PCIe memory), and then sends a command from the NVMe device to a RDMA NIC to request a transmission of the data in the temporary memory to a remote server. The processing shown in FIG. 3 can be performed, for example by server 202b of FIG. 2. In an embodiment, the NVMe device can be NVMe device 110b of FIG. 2, the temporary memory can be temporary memory 204b of FIG. 2, the RDMA NIC can be RDMA NIC 112b of FIG. 2, and the remoter server can be server 202a of FIG. 2.

At block 302, a completion action field in a NVMe command is defined to include: work queue entry (WQE) address, WQE data, NIC doorbell address, and RDMA NIC data (a doorbell queue pair number (QPN)). In an embodiment, the WQE address is the address of the WQE where the WQE data should be written. In an embodiment, the WQE data is the RDMA NIC defined WQE which is used for requesting the RDMA NIC to execute an operation such as send/receive of data to/from a remote server. In an embodiment, the NIC doorbell address is the address of the NIC doorbell register where the doorbell QPN is written to. In an embodiment, the RDMA NIC data (doorbell QPN) is the data to be written to the RDMA NIC doorbell register in the original RDMA NIC to tell the RDMA NIC which queue has the new element that requires processing.

At block 304 of FIG. 3, an operating system executing on a CPU, such as CPU 206b of FIG. 2, allocates temporary memory from the PCIe memory space, such as temporary memory 204b of FIG. 2; builds a WQE embedded NVMe read command; and sends it to a NVMe device, such as NVMe device 110b of FIG. 2. At block 306, the NVMe device reads the data and stores it in the allocated temporary memory, such as memory 204b of FIG. 2 or PCIe memory 402 of FIG. 4. After the read from the NVMe device is completed, the NVMe interface writes the WQE data to a RDMA NIC, such as RDMA NIC 112b of FIG. 2, according to its address. In an embodiment the RDMA NIC is implemented by a host channel adapter (HCA). At block 310, the NVMe writes the doorbell value to the target RDMA NIC (e.g., HCA) doorbell address.

Figure 4:
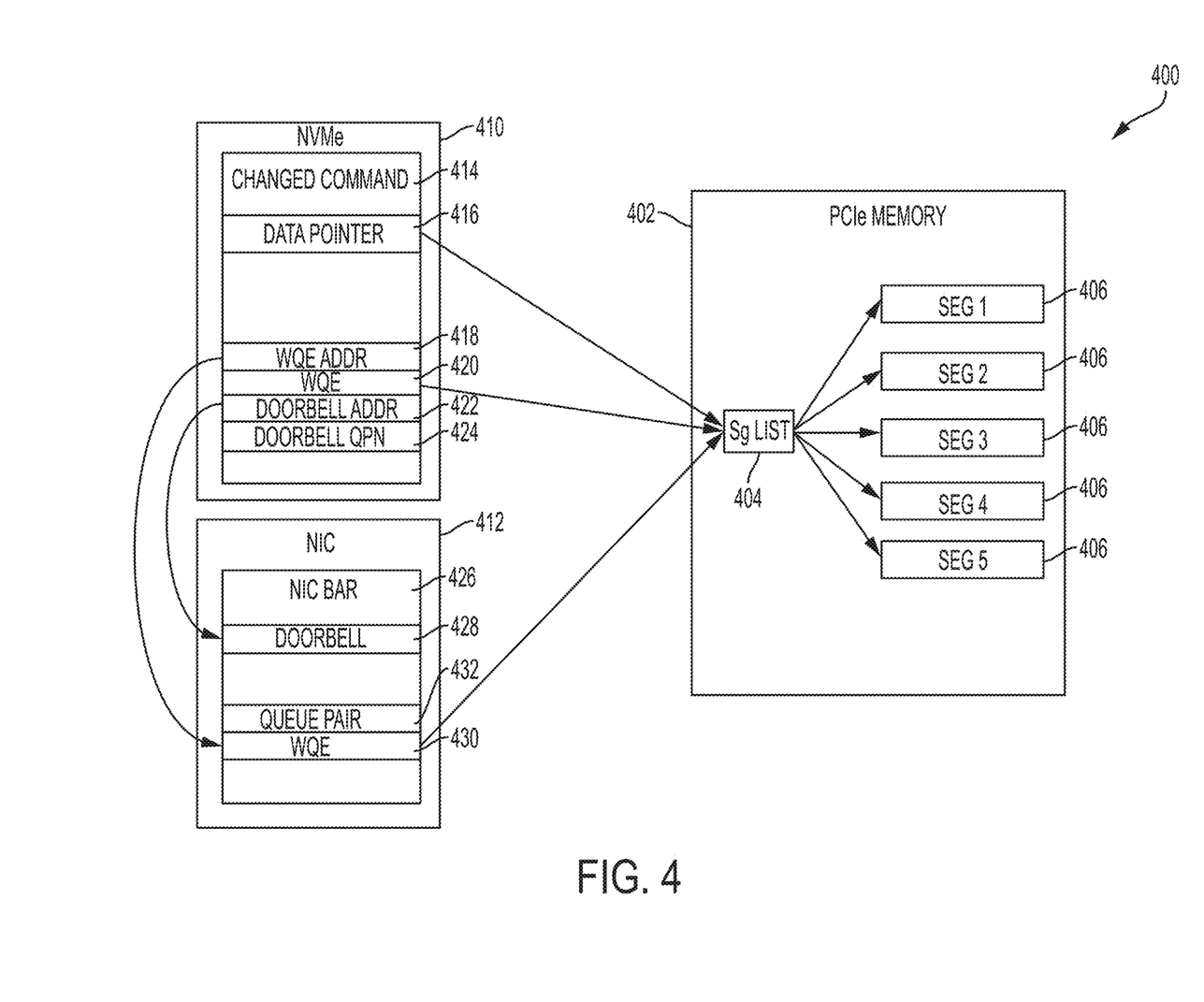
FIG. 4 depicts a block diagram of a flow between a NVMe, a NIC, and PCIe memory in accordance with one or more embodiments of the present invention.

Turning now to FIG. 4, a block diagram 400 of a flow between a NVMe device, a RDMA NIC queue element, and PCIe memory is generally shown when moving data from a RDMA NIC to a PCIe memory device in accordance with one or more embodiments of the present invention. The block diagram 400 of FIG. 4 illustrates the relationship between the new fields added to an NVMe command structure 410, and a RDMA NIC queue 412. As shown in FIG. 4, an embodiment of the new NVMe command structure 410 includes three additional/modified fields when compared to a contemporary NVMe command: WQE address field 418, WQE field 420, and doorbell address field 422. NVMe command structure 410, RDMA NIC queue 412 and PCIe memory 402 shown in FIG. 4 can be located on a sending server, such as server 202b of FIG. 2. In contemporary implementations of RDMA, both a WQE which includes a NIC RDMA command and a doorbell QPN which includes data to be written to a RDMA NIC doorbell register are written to a RDMA NIC by a CPU. In accordance with one or more embodiments described herein, these elements are written to the RDMA NIC by a NVMe device. Thus, the CPU needs to identify the data and a write location to the NVMe device. An embodiment of a NVMe command structure 410 to communicate this information to the RDMA NIC is shown in FIG. 4. In one or more embodiments, the doorbell register is physically located on the NVMe device and the WQE is in the local memory or in PCIe memory.

The block diagram 400 shown in FIG. 4 includes a NVMe command structure 410, a RDMA NIC queue 412, and PCIe memory 402. The embodiment of the NVMe command structure 410 shown in FIG. 4 includes a command field 414, a data pointer field 416, a WQE address field 418, a WQE field 420, a doorbell address field 422, and a doorbell QPN field 424. In an embodiment, the data pointer field 416 is a pointer that points to the data in the PCIe memory 402 (e.g., the temporary memory) to hold the data needed to be transmitted to remote server. In an embodiment, the WQE address field 418 is a pointer that stores the address of the RDMA NIC WQE. The WQE field 420 is the original NIC RDMA command. In an embodiment, the doorbell address field 422 is a pointer that stores the address of the RDMA NIC doorbell register. In an embodiment, the doorbell QPN field 424 is the original data to be written to the RDMA NIC doorbell register.

The embodiment of the element in the RDMA NIC queue 412 shown in FIG. 4 includes a NVMe address register (BAR) field 426, a doorbell field 428, a queue pair field 432, and a WQE field 430. As is known in the art, the WQE is a basic command element and one WQE corresponds to one operation, for example one WQE can be used to send a batch of data that is stored in the scatter gather list 404 of PCIe memory 402.

The embodiment of the PCIe memory 402 shown in FIG. 4 includes a scatter gather list 404 and several segments 406. The scatter gather list 404 can be used as a buffer to temporarily save the data moving between a NVMe device and a RDMA NIC. Typically, an operating system cannot find a continuous big buffer (such as 256 KB, 1 MB) from the PCIe memory due, for example, to memory fragmentation. As shown in FIG. 4, multiple segments 406 and a scatter gather list 404 can be used to link the segments together as one logical continuous buffer, and the RDMA NIC can transmit data that is larger than a single segment 406 in one read/write operation. As shown in the embodiment of FIG. 4, in the NVMe command structure 410, the data pointer field 416 points to the scatter gather list 404. In addition, the WQE field 420 has an embedded data pointer field which also points to the scatter gather list 404. When the WQE writes to the RDMA NIC queue pair field 432, it also has a pointer to the scatter gather list 404 so that the RDMA NIC knows the location of the data to transmit to the remote server.

As shown in FIG. 4, the element in the NIC RDMA queue 412 can be implemented by a contemporary NIC RDMA WQE. In contemporary implementations, the data in a NIC RDMA queue is written to by an operating system executing on a CPU. In accordance with one or more embodiments of the present invention, the contents of the element in the NIC RDMA queue 412 are written to by a NVMe device, and the CPU provides the NVMe device with the data source and a write location for the data. In one or more embodiments, the doorbell register is physically located on the NVMe device, and the WQE is physically located in the local memory or PCIe memory.

Figure 5:
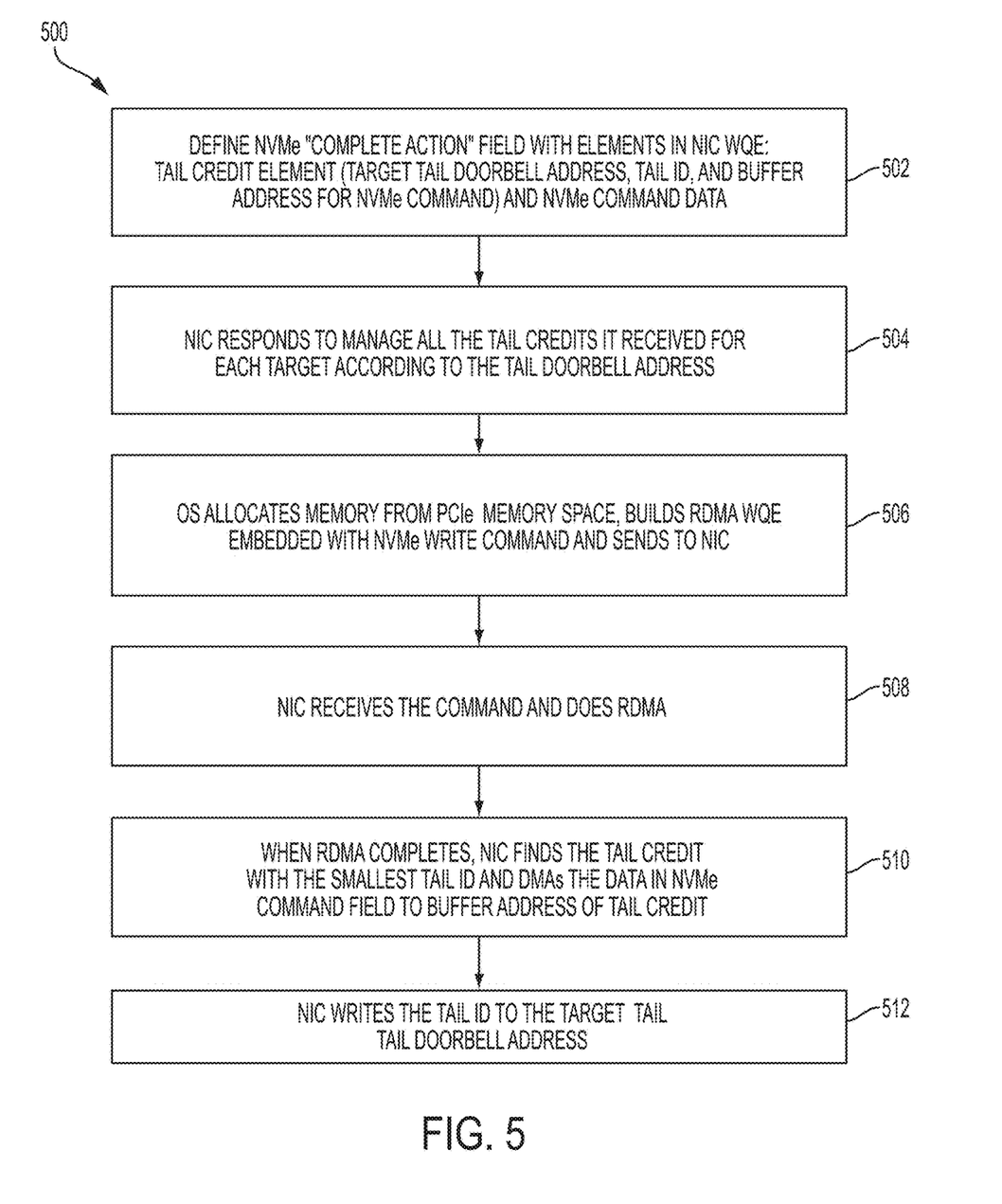
FIG. 5 depicts a process flow for moving data from a RDMA NIC to a NVMe device in accordance with one or more embodiments of the present invention.

Turning now to FIG. 5, a process flow 500 for moving data from a RDMA NIC to a NVMe device is generally shown in accordance with one or more embodiments of the present invention. The process shown in FIG. 5 can be performed, for example by a receiving server such as server 202a of FIG. 2. In an embodiment a CPU, such as CPU 206a of FIG. 2, or an operating system executing on a CPU, builds a newly defined NIC WQE which is embedded in an NVMe "complete action field" (and sent by the NVMe device to a RDMA NIC). The RDMA NIC executes the WQE to receive data from the sending server 202b using RDMA. After receiving the data from the server 202b, the RDMA NIC can send the NVMe command, according to the complete action field of the WQE, to the NVMe device. In this manner the newly defined NIC WQE is combined with the original WQE and NVMe command with the target address of the NVMe command and the doorbell address/data being stored in the newly defined NIC WQE. Additional fields utilized by contemporary WQEs are also added to the newly defined complete action field. The complete action field can have two sub-fields: a tail credit field and a NVMe command data field. The CPU sends the new combined command to the RDMA NIC device and after the RDMA NIC device is finished executing the original WQE portion it sends the NVMe portion to the NVMe device using the tail credit field which includes the target address of the NVMe command and doorbell address/data.

Turning to block 502 of FIG. 5, a NVMe "complete action field" is defined with the following elements in a NIC WQE: a tail credit field which can include the target tail doorbell address, a tail identifier field, and a memory buffer address (also referred to herein as a NVMe command address) which can point to local and/or temporary memory for the NVMe command, and NVMe command data. In an embodiment, the complete action field is written to when the RDMA NIC has finished receiving the data from a remote server, such as server 202b of FIG. 2. In an embodiment, the NIC RDMA writes the NVMe device command data to the NVMe command address, and then writes the tail identifier to the tail doorbell address. In an embodiment, the tail credit element is used by a RDMA NIC as a target address for sending the NVMe command. It contains the target address of the NVMe command data to write to and the tail identifier with the tail doorbell address. After the RDMA NIC writes the NVMe command data the to the NVMe command address, it writes the tail identifier to the tail doorbell address to indicate that a new commands have been submitted for processing.

At block 504, a RDMA NIC, such as RDMA NIC 112a of FIG. 2, responds by managing all of the tail credits it receives for each target according to the doorbell address. In this manner, the data transfer commands are performed in the order in which they are received. At block 506, an operating system on the CPU allocates temporary memory, such as temporary memory 204a of FIG. 2, from the PCIe memory space for holding the transmitted data (if needed), builds a RDMA WQE embedded with the NVMe write command and sends the RDMA WQE to the RDMA NIC. At block 508, the RDMA NIC receives the command and performs the RDMA and receives the data from a sending server, such as server 202b of FIG. 2.

At block 510, when the RDMA completes, the RDMA NIC finds the tail credit with the smallest tail identifier and performs a DMA to move the data in the NVMe command data to a buffer address of the tail credit. At block 512, the RDMA NIC writes the tail identifier to the target doorbell address to let the receiving side know that the command has been sent.

Figure 6:
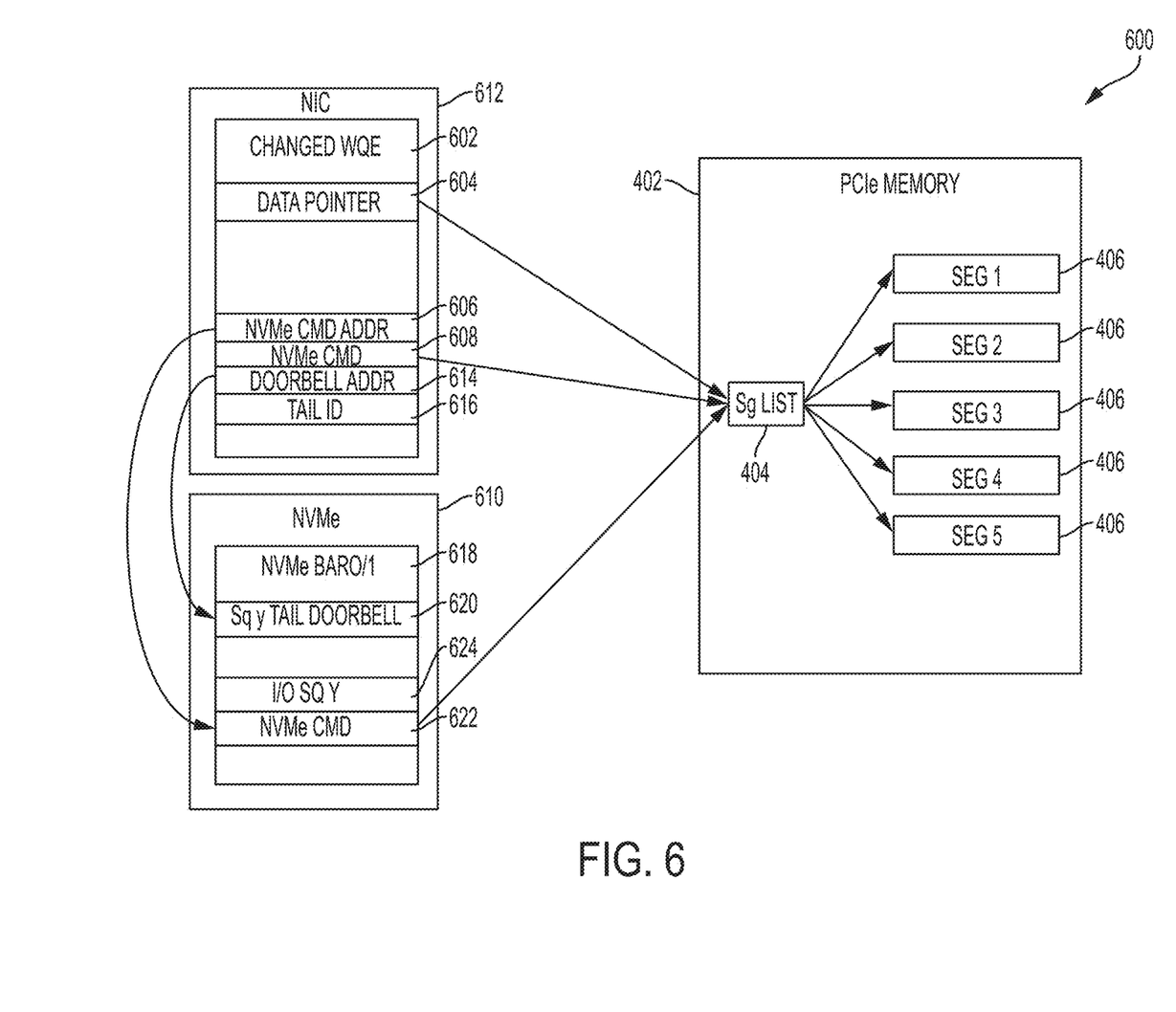
FIG. 6 depicts a block diagram of a flow between a NIC, NVMe, and PCIe memory in accordance with one or more embodiments of the present invention.

Turning now to FIG. 6, a block diagram 600 of a flow between a RDMA NIC queue element, a NVMe device, and PCIe memory is generally shown in accordance with one or more embodiments of the present invention. The block diagram 600 of FIG. 6 illustrates the relationship between the new fields added to a RDMA NIC queue element, or WQE, and a contemporary NVMe operation. As shown in FIG. 6, an embodiment of the new RDMA NIC queue element 612 includes two additional/modified fields, the NVMe command address field 606 and the doorbell address field 614, when compared to a contemporary RDMA NIC WQE.

The block diagram 600 shown in FIG. 6 includes NVMe command structure 610, RDMA NIC queue 612, and the PICe memory 402 described previously with respect to FIG. 4. The NVMe command structure 610 includes a NVMe BAR0/1 field 618, a submission queue y tail doorbell field 620, an input/output submission queue y field 624, and a NVMe command field 622. In contemporary methods, an operating system sends a NVMe command to the tail of a submission queue and then writes the doorbell register with the tail identifier. In accordance with one or more embodiments of the present invention, the NIC RDMA takes the operating system's place to write the NVMe command and the tail identifier to the NVMe device. The submission queue can be physically located in the local memory and/or in PCIe memory and it can logically in the NVMe device. The NVMe command field 622 is used to tell NVMe what to do (read/write/etc.) and where the data is from and where the data will be written (e.g., based on scatter gather list 404). The doorbell register 620 tells the NVMe device the location of the tail of the submission queue.

The RDMA NIC queue 612 shown in FIG. 4 includes a WQE field 602, a data pointer field 604, a buffer address NVMe command address field 606, a NVMe command field 608, a doorbell address field 614, and a tail identifier field 616. NVMe command address field 606 is the address where the NVMe command will be written by the RDMA NIC. The NVMe command field 608 includes a contemporary NVMe command (and not the new NVMe command structure 410 shown in FIG. 4), it tells NVMe device what to do, where the data is received from, and where to write the data that is received. The doorbell address field 614 is used to tell the NIC RDMA the tail identifier to write to as it points to the NVMe doorbell register. The tail identifier field 616 is the location of the NVMe doorbell register and it tells the NVMe device the location of the tail of the submission queue.

Figure 7:
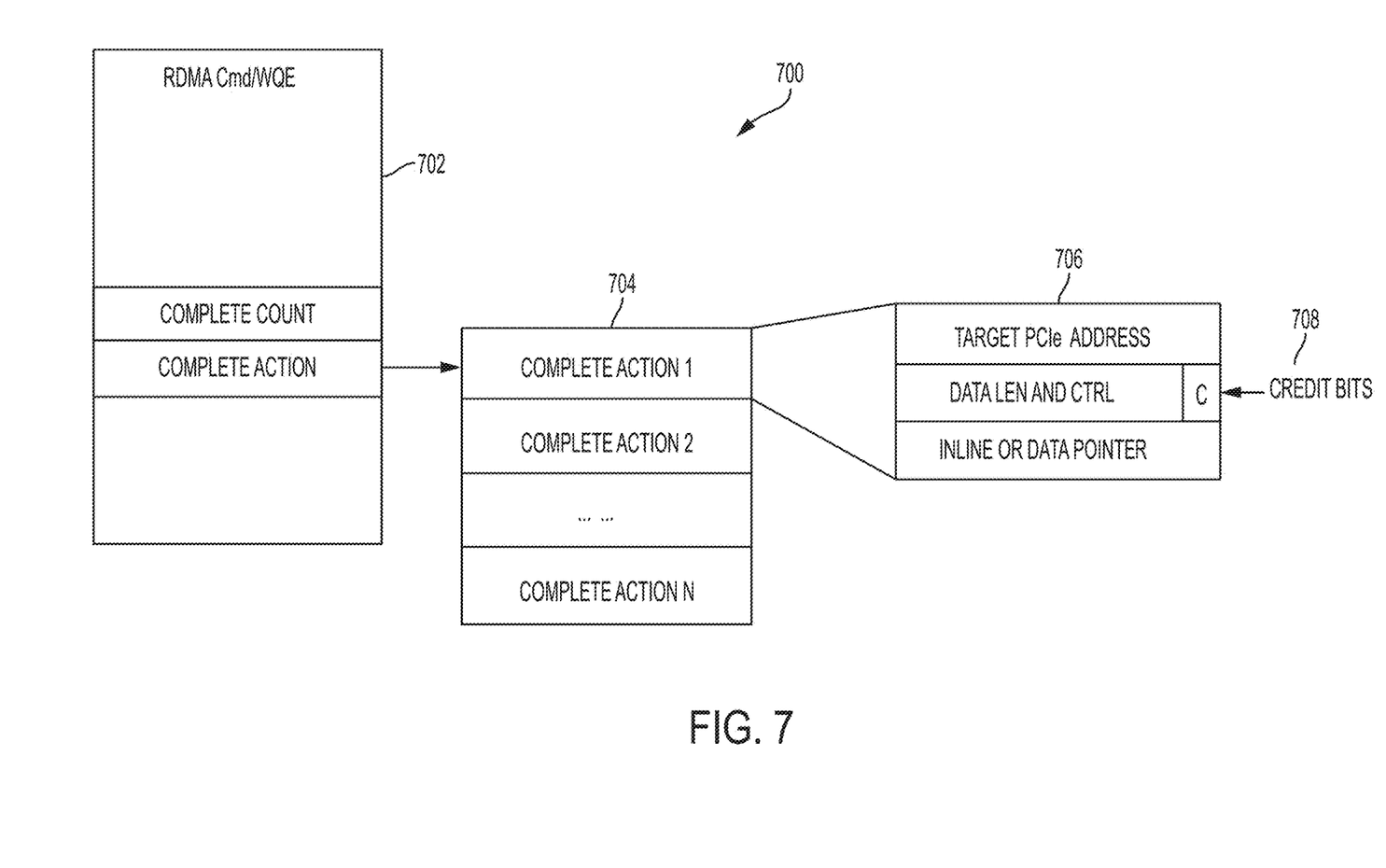
FIG. 7 depicts a block diagram of a data structure that can be utilized for any PCIe end device in accordance with one or more embodiments of the present invention.

Turning now to FIG. 7, a block diagram 700 of a data structure that can be used when the NVMe devices are PCIe devices (e.g., a peripheral device or controller) is generally shown in accordance with one or more embodiments of the present invention. The complete count record 702 indicates how many complete action records 704 follow. As shown in FIG. 7, the complete count is equal to N if there are N complete actions. In an embodiment, when the PCIe device finishes its own operation, it will execute the complete actions one by one. Each complete action includes the address and the data fields as shown in block 706. The target PCIe address field tells the PCIe device where the data (contained inline or at a location pointed to by a data pointer) should be written to. The data length and control fields show the length of the data to be written and control information such as, but not limited to credit bits 708 to indicate that the address or data are credit used by the target PCIe end device.

Figure 8:
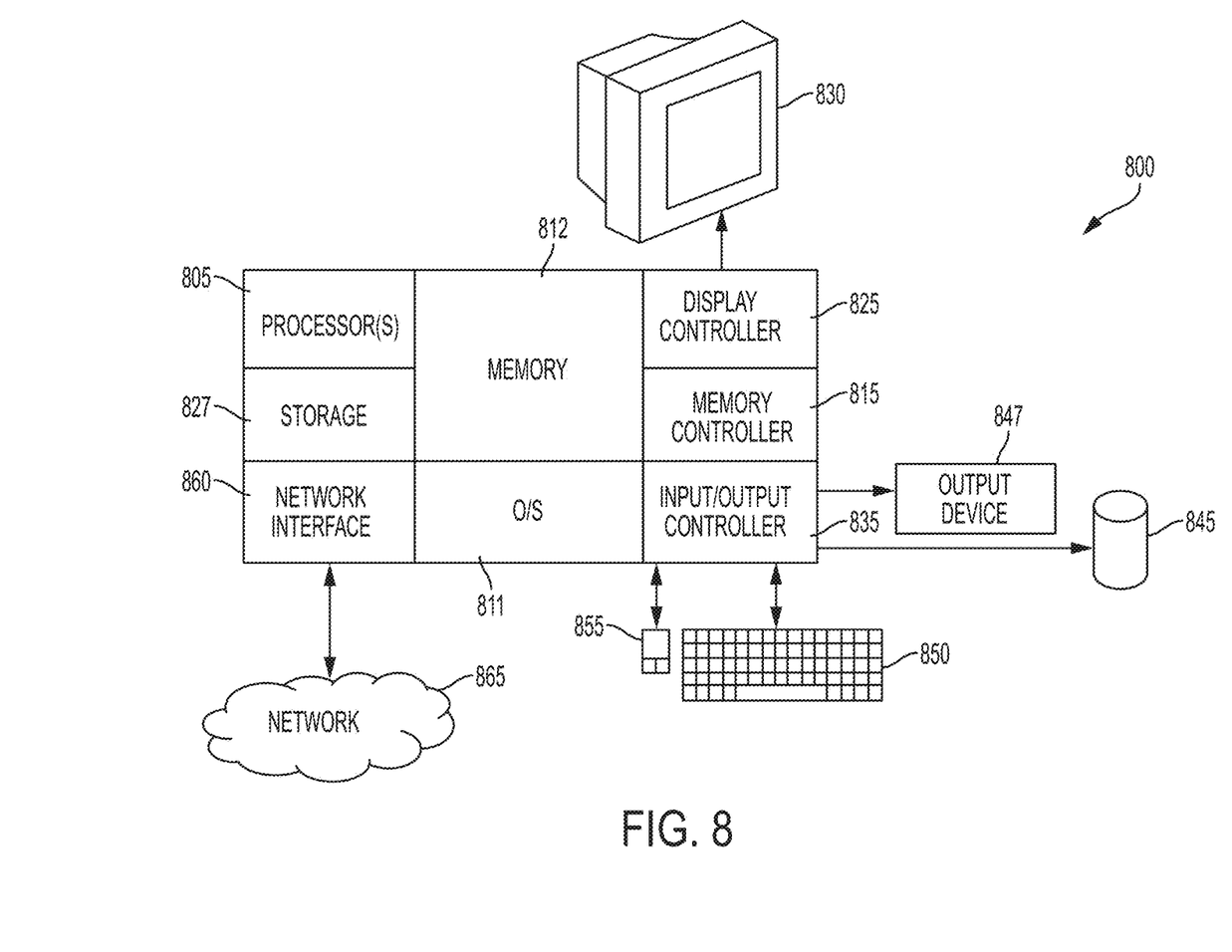
FIG. 8 is a block diagram of a computer system for implementing some or all aspects of transmitting data between servers in accordance with one or more embodiments of the present invention.

Turning now to FIG. 8, a block diagram of a computer system 800 for implementing some or all aspects of efficient silent data transmission between computer servers is generally shown in accordance with one or more embodiments of the present invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 800, such as a mobile device, personal computer, workstation, minicomputer, or mainframe computer.

In an exemplary embodiment, as shown in FIG. 8, the computer system 800 includes a processor 805, memory 812 coupled to a memory controller 815, and one or more input devices 845 and/or output devices 847, such as peripherals, that are communicatively coupled via a local I/O controller 835. These devices 847 and 845 may include, for example, a printer, a scanner, a microphone, and the like. A conventional keyboard 850 and mouse 855 may be coupled to the I/O controller 835. The I/O controller 835 may be, for example, one or more buses or other wired or wireless connections, as are known in the art. The I/O controller 835 may have additional elements, which are omitted for simplicity, such as controllers, buffers (caches), drivers, repeaters, and receivers, to enable communications.

The I/O devices 847, 845 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 805 is a hardware device for executing hardware instructions or software, particularly those stored in memory 812. The processor 805 may be a custom made or commercially available processor, a central processing unit (CPU), an auxiliary processor among several processors associated with the computer system 800, a semiconductor based microprocessor (in the form of a microchip or chip set), a microprocessor, or other device for executing instructions. The processor 805 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 812 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 812 may incorporate electronic, magnetic, optical, or other types of storage media. Note that the memory 812 may have a distributed architecture, where various components are situated remote from one another but may be accessed by the processor 805.

The instructions in memory 812 may include one or more separate programs, each of which comprises an ordered listing of executable instructions for implementing logical functions. In the example of FIG. 8, the instructions in the memory 812 include a suitable operating system (OS) 811. The operating system 811 essentially may control the execution of other computer programs and provides scheduling, input-output control, file and data management, memory management, and communication control and related services.

Additional data, including, for example, instructions for the processor 805 or other retrievable information, may be stored in storage 827, which may be a storage device such as a hard disk drive or solid state drive. The stored instructions in memory 812 or in storage 827 may include those enabling the processor to execute one or more aspects of the dispatch systems and methods of this disclosure.

The computer system 800 may further include a display controller 825 coupled to a display 830. In an exemplary embodiment, the computer system 800 may further include a network interface 860 for coupling to a network 865. The network 865 may be an IP-based network for communication between the computer system 800 and an external server, client and the like via a broadband connection. The network 865 transmits and receives data between the computer system 800 and external systems. In an exemplary embodiment, the network 865 may be a managed IP network administered by a service provider. The network 865 may be implemented in a wireless fashion, e.g., using wireless protocols and technologies, such as WiFi, WiMax, etc. The network 865 may also be a packet-switched network such as a local area network, wide area network, metropolitan area network, the Internet, or other similar type of network environment. The network 865 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for providing efficient silent data transmission between computer servers can be embodied, in whole or in part, in computer program products or in computer systems 800, such as that illustrated in FIG. 8.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving a request to transfer data from a first storage device to a second storage device, the first storage device coupled to a sending server and the second storage device coupled to a receiving server, the request received from an operating system executing on a processor of the sending server;
allocating, by the operating system executing on a processor of the sending server, a first temporary memory on the sending server; and
transferring the data from the first storage device to the second storage device in response to the request, the transferring performed independently of the operating system executing on a processor of the sending server, and the transferring comprising:
moving the data from the first storage device to the first temporary memory;
initiating a transfer of the data to the second storage device via a remote direct memory access (RDMA) between the first temporary memory and a second temporary memory on the second server, the RDMA causing the data to be transferred from the first temporary memory to the second temporary memory independently of an operating system executing on a processor of the receiving server; and
receiving a notification that the transfer to the second storage device was completed.

2. The method of claim 1, wherein the first storage device is a peripheral storage device.

3. The method of claim 1, wherein the first storage device and the second storage device are accessed via peripheral component interconnect express (PCIe) switches and a non-volatile memory express (NVMe) protocol.

4. The method of claim 3, wherein a NVMe command is imbedded in a work queue entry of a work queue of the RDMA.

5. The method of claim 3, wherein the first temporary memory is allocated from a PCIe memory space on the sending server.

6. The method of claim 1, wherein the data is transferred without sending interrupts to the operating system executing on a processor of the sending server.

7. The method of claim 1, wherein the data is transferred independently of a memory bus coupled to a processor of the sending server and a local memory of the sending server.

8. A system comprising:
a memory having computer readable instructions; and
one or more processors for executing the computer readable instructions, the computer readable instructions controlling the one or more processors to perform operations comprising:
receiving a request to transfer data from a first storage device to a second storage device, the first storage device coupled to a sending server and the second storage device coupled to a receiving server, the request received from an operating system executing on a processor of the sending server;
allocating, by the operating system executing on a processor of the sending server, a first temporary memory on the sending server; and
transferring the data from the first storage device to the second storage device in response to the request, the transferring performed independently of the operating system executing on a processor of the sending server, and the transferring comprising:
moving the data from the first storage device to the first temporary memory;
initiating a transfer of the data to the second storage device via a remote direct memory access (RDMA) between the first temporary memory and a second temporary memory on the second server, the RDMA causing the data to be transferred from the first temporary memory to the second temporary memory and independently of an operating system executing on a processor of the receiving server; and
receiving a notification that the transfer to the second storage device was completed.

9. The system of claim 8, wherein the first storage device is a peripheral storage device.

10. The system of claim 8, wherein the first storage device and the second storage device are accessed via peripheral component interconnect express (PCIe) switches and a non-volatile memory express (NVMe) protocol.

11. The system of claim 10, wherein a NVMe command is imbedded in a work queue entry of a work queue of the RDMA.

12. The system of claim 10, wherein the first temporary memory is allocated from a PCIe memory space on the sending server.

13. The system of claim 8, wherein the data is transferred without sending interrupts to the operating system executing on a processor of the sending server.

14. The system of claim 8, wherein the data is transferred independently of a memory bus coupled to a processor of the sending server and a local memory of the sending server.

15. A computer program product comprising a computer readable storage medium having program instructions embodied therewith, the program instructions executable by a processor to cause the processor to perform operations comprising:
receiving a request to transfer data from a first storage device to a second storage device, the first storage device coupled to a sending server and the second storage device coupled to a receiving server, the request received from an operating system executing on a processor of the sending server;
allocating, by the operating system executing on a processor of the sending server, a first temporary memory on the sending server; and
transferring the data from the first storage device to the second storage device in response to the request, the transferring performed independently of the operating system executing on a processor of the sending server, and the transferring comprising:
moving the data from the first storage device to the first temporary memory;
initiating a transfer of the data to the second storage device via a remote direct memory access (RDMA) between the first temporary memory and a second temporary memory on the second server, the RDMA causing the data to be transferred from the first temporary memory to the second temporary memory independently of an operating system executing on a processor of the receiving server; and
receiving a notification that the transfer to the second storage device was completed.

16. The computer program product of claim 15, wherein the first storage device is a peripheral storage device.

17. The computer program product of claim 15, wherein the first storage device and the second storage device are accessed via peripheral component interconnect express (PCIe) switches and a non-volatile memory express (NVMe) protocol.

18. The computer program product of claim 17, wherein a NVMe command is imbedded in a work queue entry of work queue of the RDMA.

19. The computer program product of claim 17, wherein the first temporary memory is allocated from a PCIe memory space on the sending server.

20. The computer program product of claim 15, wherein the data is transferred without sending interrupts to the operating system executing on a processor of the sending server, and without utilizing a memory bus coupled to a processor of the sending server and a local memory of the sending server.

* * * * *